United States Patent
Sauer

(10) Patent No.: US 9,158,981 B2
(45) Date of Patent: Oct. 13, 2015

(54) METHOD AND SYSTEM FOR EVALUATING THE QUALITY OF A RENDERED IMAGE

(75) Inventor: Andrew James Sauer, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 871 days.

(21) Appl. No.: 13/430,026

(22) Filed: Mar. 26, 2012

(65) Prior Publication Data

US 2013/0251272 A1     Sep. 26, 2013

(51) Int. Cl.
*G06K 9/03* (2006.01)
*G06K 9/46* (2006.01)
*G06T 5/20* (2006.01)
*G06T 7/00* (2006.01)

(52) U.S. Cl.
CPC ............. *G06K 9/036* (2013.01); *G06K 9/4619* (2013.01); *G06T 5/20* (2013.01); *G06T 7/0085* (2013.01)

(58) Field of Classification Search
USPC ................................. 382/111, 112, 260–266
See application file for complete search history.

(56) References Cited

U.S. PATENT DOCUMENTS

| | | |
|---|---|---|
| 5,574,212 A | 11/1996 | Madsen et al. |
| 6,167,144 A | 12/2000 | Nishiguchi et al. |
| 6,490,375 B1 | 12/2002 | Garakani et al. |
| 6,753,965 B2 | 6/2004 | Kumar et al. |
| 6,847,733 B2 | 1/2005 | Savakis et al. |
| 6,970,174 B2 | 11/2005 | Fujiwara et al. |
| 7,199,831 B2 | 4/2007 | Nonaka |
| 7,433,085 B2 | 10/2008 | Ahmed et al. |
| 7,734,107 B2 | 6/2010 | Li |
| 8,044,945 B2 | 10/2011 | Takamori et al. |
| 8,538,086 B2 * | 9/2013 | Yamakawa ..................... 382/112 |
| 2007/0263238 A1 * | 11/2007 | Lieberman et al. ............ 358/1.9 |
| 2008/0121792 A1 | 5/2008 | Kusunoki |
| 2008/0159624 A1 | 7/2008 | Sathish et al. |
| 2008/0232646 A1 | 9/2008 | Lex |

* cited by examiner

*Primary Examiner* — Wesley Tucker
(74) *Attorney, Agent, or Firm* — Christian M. Best; William E. Gallagher; Charles R. Ware

(57) ABSTRACT

Techniques for evaluating the quality of a an image on a printing surface. The techniques generally includes receiving a first signal corresponding to the original image and a second signal corresponding to the rendition of the original image. The techniques further include filtering both signals using a common set of filters to extract at least partial contours of the original image and of its rendition and to determine a quality value of the rendition of the original image based on a comparison between the filtered images in the frequency domain.

20 Claims, 10 Drawing Sheets

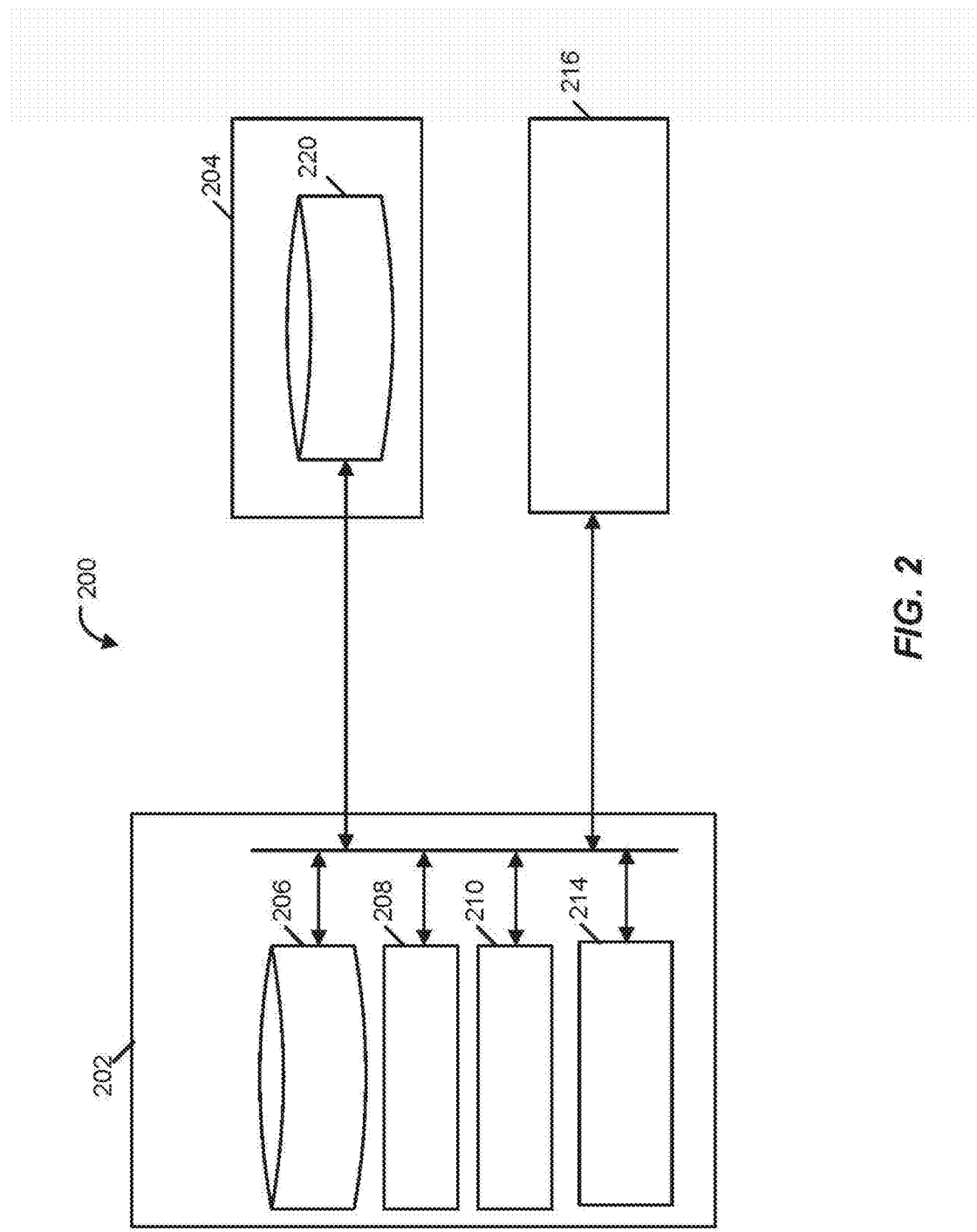

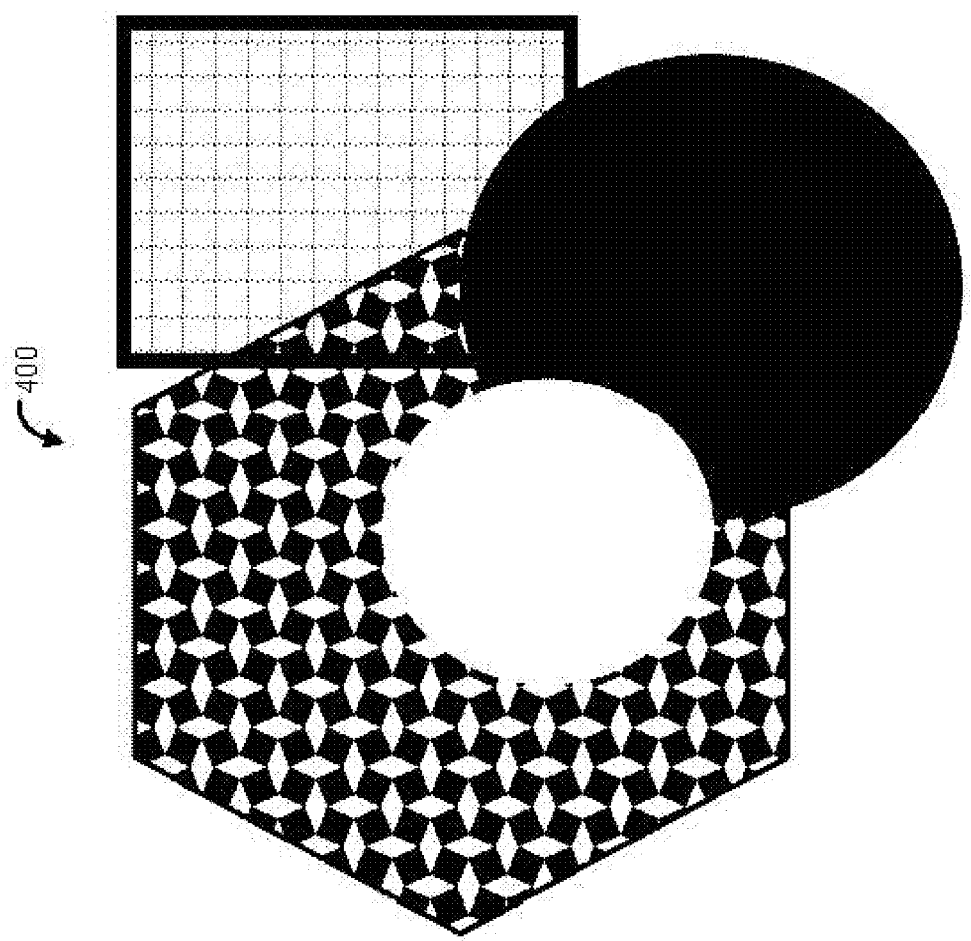

METHOD AND SYSTEM FOR EVALUATING THE QUALITY OF A RENDERED IMAGE

FIELD OF THE INVENTION

This disclosure relates generally to the field of image processing and, more particularly, to methods and systems for evaluating the quality of a rendered image.

BACKGROUND OF THE INVENTION

It is very common to print graphics, or images (e.g., animations, photographic images, geometric shapes, representations of animals, plants, etc.) on different surfaces. The quality of a printed rendering of an image, e.g., in terms of the visibility and clarity of one or more given features of the printed image, may depend on various attributes of the surface onto which the image is printed, as well as on various characteristics of the image itself.

Attributes of the surface onto which the image is printed that may affect the quality of the printed rendering of the image may include material, shape, various chemical properties of the surface, and so on. For example, the quality of a printed image will generally be higher when printed on a sheet of paper than when printed on fabric. Similarly, the quality of an image printed on a single section of a relatively firm piece of fabric will generally be higher than that of the same image printed on several sections (e.g., stitched together) of elastic, amorphous fabric.

Characteristics of the image that may affect the quality of the printed rendering of the image may include thickness of lines in the image, contrast within the image, contrast between the image and the background, size of the image, and so on. For instance, the quality of a printed image that has relatively thick lines will generally be higher that the quality of a printed image that has relatively thin lines. Likewise, a printed rendering of larger image will generally result in higher quality.

Various other factors may affect the quality of a printed rendering of an image. For example, image quality may deteriorate with repeated application of the same image to a number of mass-produced articles during the course of a manufacturing run.

Absorbent articles, such diapers, present particular challenges with regard to printing images (e.g., cartoon characters), because such articles often include various surfaces of different layers, shapes, materials, seam patterns, and so on. As a result, when printing images on absorbent articles, the quality of the printed graphic often needs to be evaluated. The quality of the printed image may need to be evaluated, for example, for quality control purposes during manufacturing (e.g., to ensure that absorbent articles are produced to meet or exceed certain requirements). Additionally, or alternatively, the quality of the printed image may need to be evaluated during product development, e.g., to develop new absorbent articles that are better suited for displaying printed images.

SUMMARY OF THE INVENTION

The present disclosure provides techniques for evaluating the quality of an image. In one embodiment, a technique for evaluating the quality of an image includes receiving a first signal indicative of a first image. The technique further includes receiving a second signal indicative of a second image that is related to the first image. The technique further includes generating a first filtered signal corresponding to a filtered first image by passing the first received signal through one or more filters. The technique further includes generating a second filtered signal corresponding to a filtered second image by passing the second received signal through the same one or more filters. The technique further includes determining a quality value of the second image based on a difference between the first filtered signal and the second filtered signal.

In various implementations, one or more of the following features may be included. The second image may be a scanned rendition of the first image printed on the printing surface. The second image may also be a simulated printed rendition of the first image. Also, the first image may be a foreground portion of another, third image, and the second image may be a background portion of the third image.

The one or more filters may include a Gabor filter, and the filters may all have the same center frequency but different orientation. The center frequency may be selected based on a set of training images.

Generating the first filtered signal by passing the first received signal through one or more filters may include passing the first received signal through multiple Gabor filters to generate a first group of filtered signals and adding together at least some of the filtered signals in the first group of filtered signals. Likewise, generating the second filtered signal by passing the second received signal through one or more filters may include passing the second received signal through the multiple Gabor filters to generate a second group of filtered signals and adding together at least some of the filtered signals in the second group of filtered signals.

Determining the quality value may include determining a difference between the first filtered signal and the second filtered signal on a pixel-by-pixel basis. Determining the quality value may further include determining a set of absolute values including an absolute value of the determined difference for every pixel. Determining the quality value may further include determining a sum of the determined set of absolute values and determining the quality value of the second image based on the determined sum. The quality value may be quantified as a number on a scale between 0 and 10, with 0 indicating lowest quality and 10 indicating highest quality.

In another embodiment, a method of evaluating quality of an image may be used in an image quality evaluation computing system. The image quality evaluation computing system may have a processor and memory. The memory may include computer-readable instructions, which, when executed on the processor, may implement an image quality evaluation application. The method includes using the image quality evaluation application to receive a first signal indicative of a first image. The method further includes using the image quality evaluation application to receive a second signal indicative of a second image. The second image corresponds to a rendition of the first image on a printing surface. The method further includes using the image quality evaluation application to extract at least a partial contour of the first image. The method further includes using the image quality evaluation application to extract at least a partial contour of the second image. The image further include using the image quality evaluation application to determine a quality value for the second image based on a difference between the partial contour of the first image and the partial contour of the second image.

In various implementations, one or more of the following features may be included. The second image may be a scanned rendition of the first image printed on the printing surface. The second image may also be a simulated printed rendition of the first image.

The method may further include optimizing one or more attributes of the printing surface based on the determined quality value to improve the capacity of the printing surface to display an image. Attributes of the printing surface may include, by way of example only, topology, chemical properties, thickness, a seam pattern, shape. Additionally, the method may include optimizing the appearance of an image on the printing surface by modifying the characteristics of the image itself (e.g., line thickness, contrast ratio, size, and so on).

Using the image quality evaluation application to extract the contour of the first image may include using the image quality evaluation application to generate a first filtered signal by passing the first received signal through one or more filters. Likewise, using the image quality evaluation application to extract the contour of the second image may include using the image quality evaluation application to generate a second filtered signal by passing the second received signal through the same one or more filters. The filter may include one or more Gabor filters.

In another embodiment, a system for evaluating quality of an image has a processor and memory. The memory includes computer-readable instructions, which, when executed on the processor, implement an image quality evaluation application. The image quality evaluation application is configured to receive a first signal indicative of a first image. The image quality evaluation application is further configured to receive a second signal indicative of a second image. The second image corresponds to a rendition of the first image on a printing surface. The image quality evaluation application is further configured to generate a first filtered signal corresponding to a filtered first image by passing the first received signal through one or more filters. The image quality evaluation application is further configured to generate a second filtered signal corresponding to a filtered second image by passing the second received signal through the same one or more filters. The image quality evaluation application is further configured to determine a quality value of the second image based on a difference between the first filtered signal and the second filtered signal.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

FIG. 2 is a block diagram illustrating an example image quality evaluation environment;

FIG. 4 illustrates an example image that may be printed on absorbent articles;

Like reference numbers and designations in the various drawings indicate like elements.

DETAILED DESCRIPTION OF THE INVENTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the disclosed functionality and many of the disclosed principles are best implemented with or in software programs or instructions and integrated circuits (ICs) such as application specific ICs. It is expected that one of ordinary skill, notwithstanding possibly significant effort and many design choices motivated by, for example, available, time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Structural Basis for the Image Quality Evaluation System

Figure 1A:
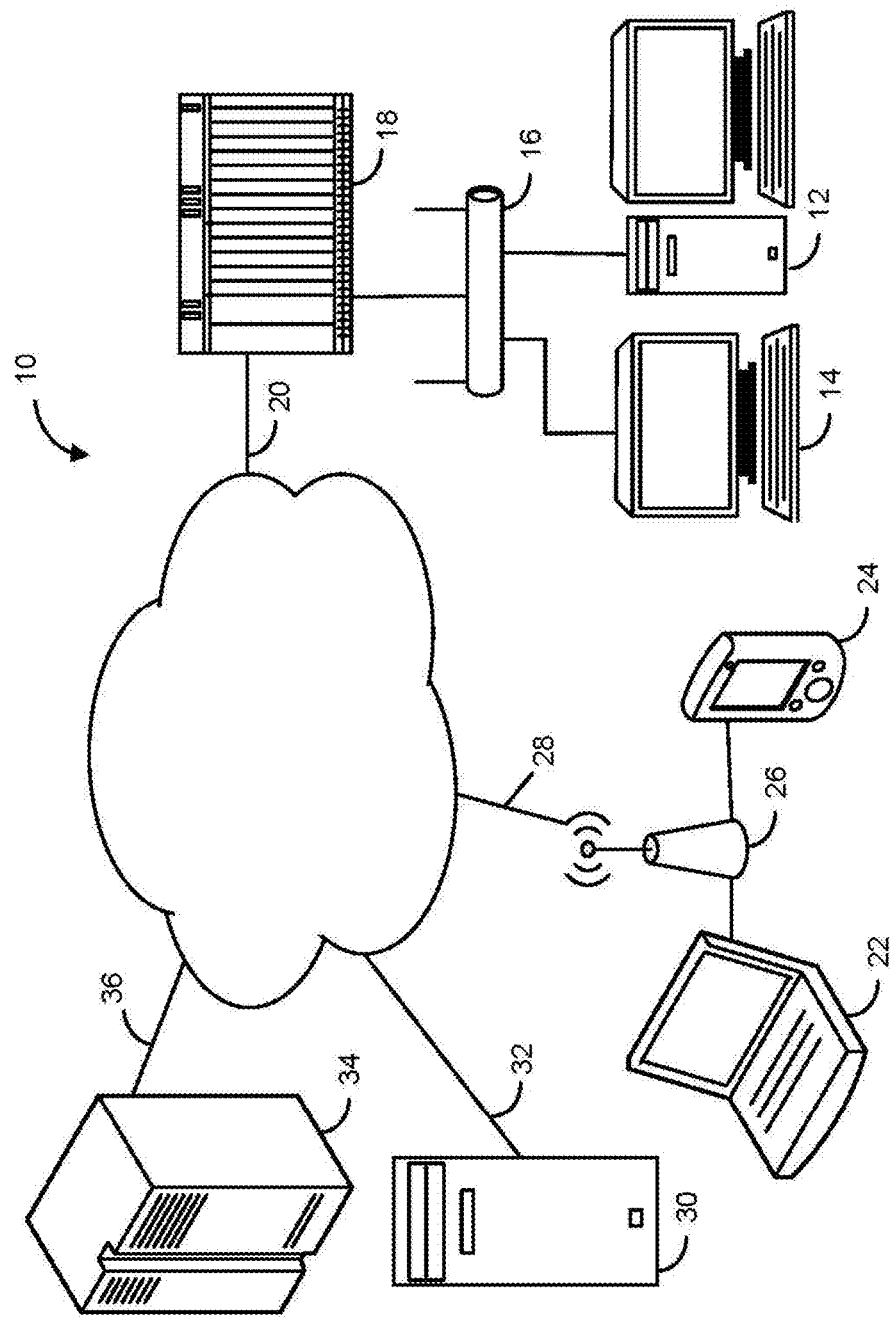
FIG. 1A is a block diagram illustrating an example computer network.
Figure 1B:
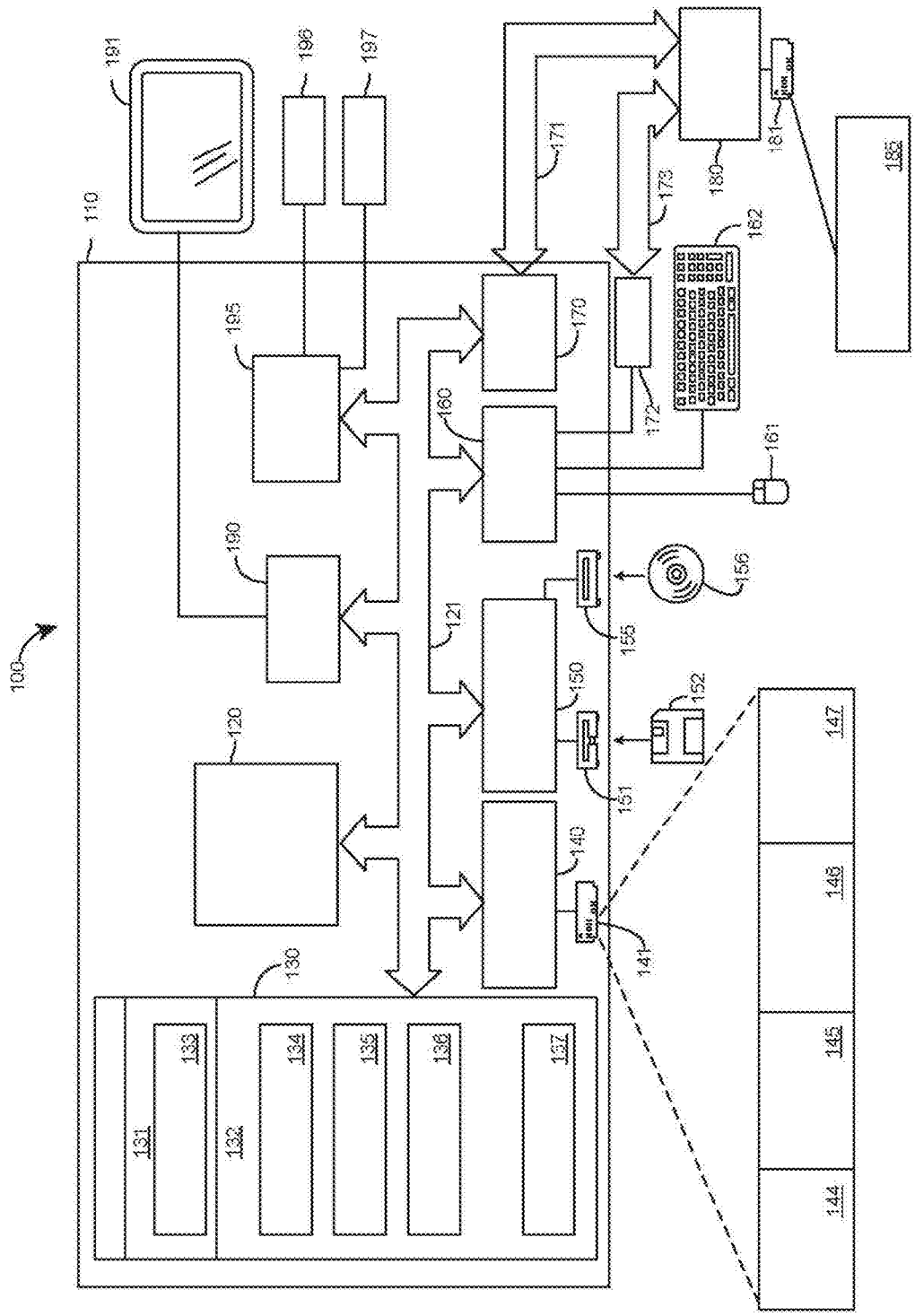
FIG. 1B is a block diagram illustrating an example computer that may be connected to the network of FIG. 1A.

FIGS. 1A-1B provide a structural basis for the network and computational platforms related to the instant disclosure.

FIG. 1A illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 1B illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, PCI Express (PCIe) bus, Accelerated Graphic Port (AGP) bus, and so on.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up; is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state. RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B, provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. However, it will be understood by one of ordinary skill in the art that different modules may be combined or subdivided. A user may enter commands and information into the computer 20 through input devices such as a keyboard 162 and cursor control device 161, commonly referred to, as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181.

The communications connections 170, 172 allow the device to communicate with other devices. The communications connections 170, 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

FIG. 2 illustrates an example image quality evaluation environment 200. Systems described in reference to FIG. 2 may be coupled to a network similar to the network 10 described in FIG. 1A. The systems described in reference to FIG. 2 may further include and/or be implemented on one or more computers similar to the computer 110 described in FIG. 1B.

Overview of the Image Quality Evaluation Environment

Referring to FIG. 2, the image quality evaluation environment 200 may include an image quality evaluation system 202 that, broadly speaking, evaluates the quality of images that are printed on uneven and/or generally irregular surfaces (e.g., of absorbent articles, such as diapers), or simulated as having been printed on such surfaces (further herein "print-simulated") using an appropriate printing simulation computer program that factors in such variables as, by way of example only, the geometry, topography and seam locations of the substrate(s) onto which the image would be printed. More specifically, the image quality evaluation system 202 compares printed and/or print-simulated images with the corresponding original images (i.e., images as they were intended to be printed) and determines a quality score (e.g., from 0 to 10, with 0 being lowest and 10 being highest) for the printed and/or print-simulated images based on how closely they resemble the corresponding original images. As a result, the image quality evaluation system 202 provides an objective measurement of quality that may be useful in the context of quality control (e.g., when manufacturing new absorbent articles), during product development (e.g., when developing new materials for an absorbent article), and so on.

The image quality evaluation system 200 may include a number of units, or components 206-214. For example, the image quality evaluation system 202 may include a database 206 for storing various types of data, such a training data and/or images, parameters necessary for performing image quality evaluation, historical data, and so on. The image quality evaluation system 202 may further include a data collector 208 and a communication interface 210 to interact with other systems, including, for example, external databases 220 that may be available on remote servers, different data providers 204, image generators 216 (e.g., scanners), etc. to collect various data that may be needed for image quality evaluation. Still further, the image quality evaluation system 202 may include an image quality evaluation application 214 that performs image quality evaluation functions described below. It should be understood that the image quality evaluation system 202, in some embodiments, or in some modes of operation, may not include one or more of the units 206-214 or, alternatively, may not use each of the units 206-214 in evaluating the quality of printed and/or print-simulated images. Further, it will be appreciated that, if desired, some of the units 206-214 may be combined, or divided into distinct units.

Image Processing with Two-Dimensional Filters

Before discussing the details of the image quality evaluation, it may be helpful to provide some details regarding certain image processing techniques. In particular, a brief overview of two-dimensional filters, such Gabor filters, may be useful.

Generally speaking, Gabor filters are filters that have an impulse response defined by a harmonic function multiplied by a Gaussian function. More specifically, in the spatial domain, the impulse response of a Gabor filter may be defined as follows:

$$g(x,y)=s(x,y)w(x,y) \quad (1)$$

where functions s(x,y) and w(x,y) are a complex sinusoid know as a "carrier" and a two-dimensional Gaussian-shaped function known as an "envelope," respectively, that may be defined as follows:

$$s(x,y)=\exp(-i(2\pi(u_0 x+v_0 u))) \quad (2)$$

$$w(x,y)=K\exp(-\pi(a^2(x-x_0)_r^2+b^2(y-y_0)_r^2)), \quad (3)$$

where $u_0$ and $v_0$ define the spatial frequency of the sinusoid in Cartesian coordinates (that may also be represented in polar coordinates as a magnitude $F_0$ and an angle $\omega_0$); ($x_0$, $y_0$) is the peak of the function; K, a and b are scaling parameters; and the r subscript stands for a rotation operation, for example, represented as $$(x-x_0)_r=(x-x_0)\cos\theta+(y-y_0)\sin\theta \quad (4)$$

and $$(y-y_0)_r=-(x-x_0)\sin\theta+(y-y_0)\cos\theta \quad (5)$$

where θ is the orientation of the Gabor filter.

The two-dimensional Fourier transform of a Gabor filter may be represented in Cartesian coordinates as follows:

$$G(u, v) = \frac{K}{ab}\exp(-i(2\pi(x_{0r}u + y_{0r}v))) \times \exp\left(-\pi\left(\left(\frac{(u-u_0)_r}{a}\right)^2 + \left(\frac{(v-v_0)_r}{b}\right)^2\right)\right) \quad (6)$$

or in polar coordinates as:

$$|G(u, v)| = \frac{K}{ab}\exp\left(-\pi\left(\left(\frac{(u-u_0)_r}{a}\right)^2 + \left(\frac{(v-v_0)_r}{b}\right)^2\right)\right) \quad (7)$$

and $$\arg G(u, v) = 2\pi(x_{0r}u + y_{0r}v) \quad (8)$$

As can be inferred from equation (7), in frequency domain, the transfer function of a Gabor filter is generally a Gaussian-shaped function associated with a particular spatial frequency and a particular orientation.

Figure 3B:
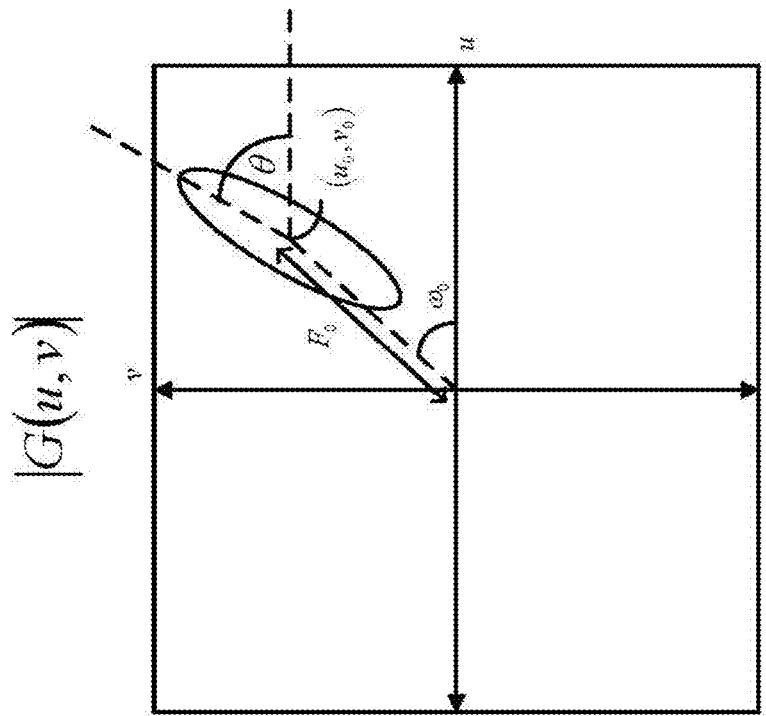
FIG. 3B illustrates the spectral density of the example Gabor filter in FIG. 3A in contour form.
Figure 3A:
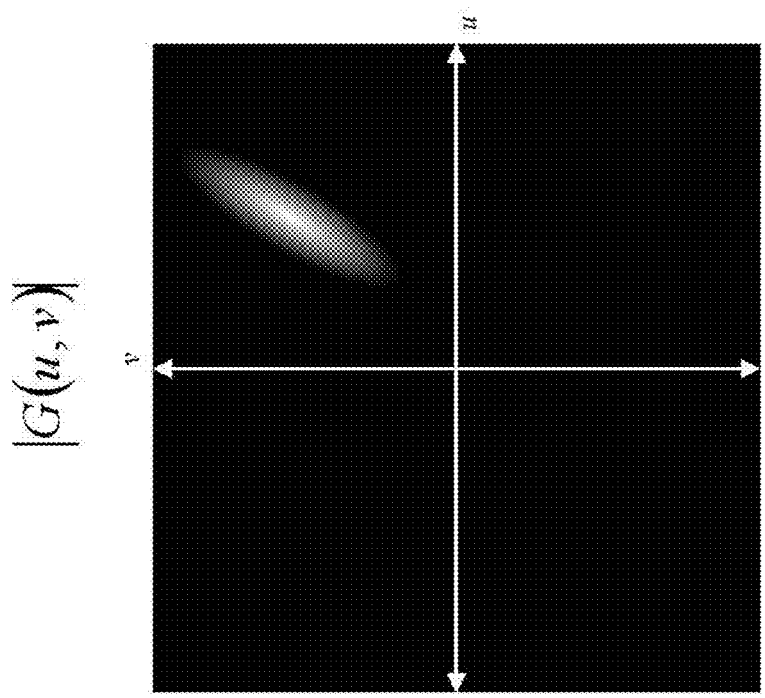
FIG. 3A illustrates spectral density of an example Gabor filter.

FIG. 3A illustrates spectral density of an example Gabor filter, such as a Gabor filter described by equations (1)-(7), and FIG. 3B illustrates the same spectral density in contour form. As illustrated in FIG. 3B, the iso-magnitude contours of the transfer function of the example Gabor filter are ellipsoidal (for ease of explanation, only one ellipsoid is shown). $F_0$ and $\omega_0$, are polar coordinates of the peak of the envelope (corresponding to $u_0$ and $v_0$ in Cartesian coordinates), and $\theta$ is the angle of rotation of the envelope and is indicative of the orientation of the envelope. Although not shown in FIG. 3B for ease of explanation, the scaling factors a and b are related to the transverse and the conjugate diameters, respectfully, of the iso-magnitude contours.

As can be inferred from FIG. 3B, a Gabor filter is effectively an oriented bandpass filter that may be used to filter a particular (and, possibly, narrow) band of spatial frequencies (depending on $F_0$, a and b) in a particular spatial direction (substantially perpendicular to the angle of rotation $\theta$). For example, in the context of image processing, $F_0$ may be selected in such a way as to extract only the spatial frequencies that largely correspond to the edges, or ridges, of the image.

Generally, a Gabor filter may be designed to have a central frequency $F_0$ that corresponds to the edges within a particular image (e.g., image 420 illustrated in FIG. 4B), or within a particular group of images that share some visual characteristics. Furthermore, the central frequency $F_0$ of a Gabor filter may be selected based on an intended viewing distance. (e.g., the distance between the image and the human eye), on a given image resolution, a given image type (e.g., illustrative image, photorealistic image, and so on), etc.

Figure 5B:
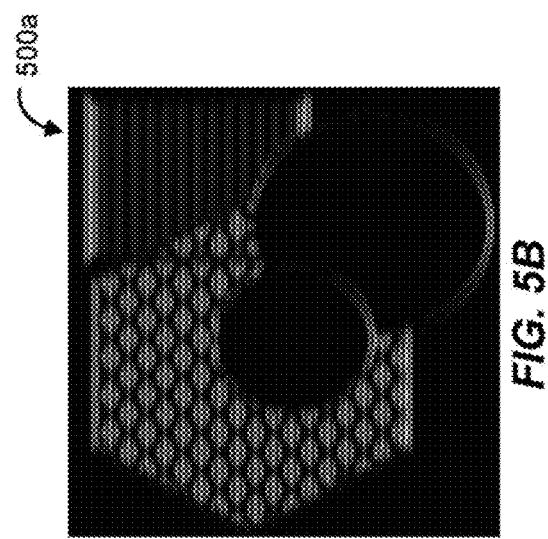
FIG. 5B illustrates the spectral density of a filtered image that may result from applying the Gabor filter in FIG. 5A to the example image in FIG. 4.
Figure 5A:
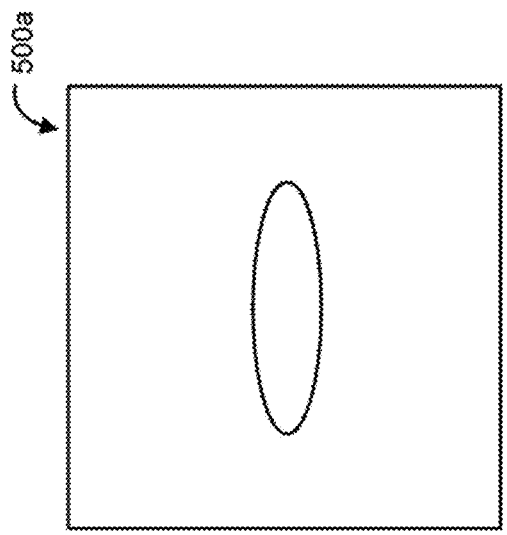
FIG. 5A illustrates the spectral density of an example Gabor filter with an angle of rotation of 0.

FIG. 4 illustrates an example original image 400, and FIGS. 5A-7B illustrate various spectral densities of various Gabor filters and how these Gabor filters may be used to extract the edges of the example original image 400 in FIG. 4. For example, FIG. 5A illustrates the spectral density of an example Gabor filter 500a with an angle of rotation $\theta$ of 0, and FIG. 5B illustrates the spectral density of a filtered, image 500b that may result from applying the Gabor filter 500a of FIG. 5A to the original image 400 illustrated in FIG. 4. In the filtered image 500b, the edges of the original image 400 that are substantially horizontal (and perpendicular to the vertical orientation of the envelope of the Gabor filter 500a) are more pronounced than are other elements within the original image 400. Accordingly, a Gabor filter 500a with an angle of rotation $\theta$ of 0 may be used to extract edges of an image, such as the image 400 illustrated in FIG. 4, along a vertical path.

Figure 6B:
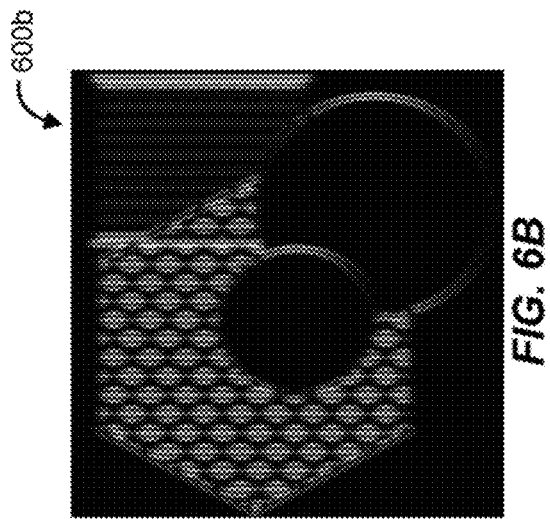
FIG. 6B illustrates the spectral density of a filtered image that may result from applying the Gabor filter in FIG. 6A to the example image in FIG. 4.
Figure 6A:
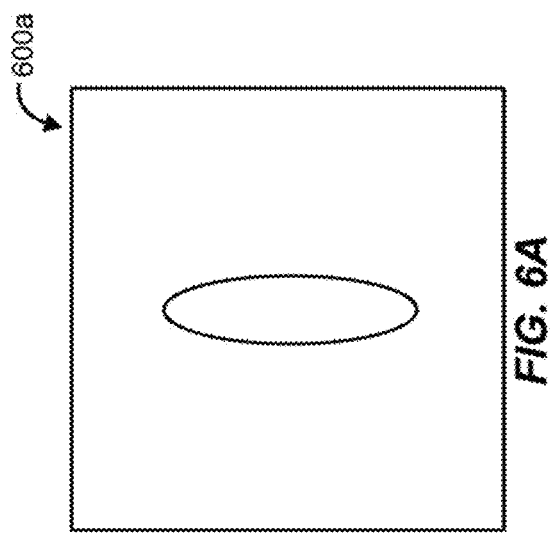
FIG. 6A illustrates the spectral density of an example Gabor filter with an angle of rotation of $\pi/2$.

Similarly, FIG. 6A illustrates spectral density of an example Gabor filter 600a with an angle of rotation $\theta$ of $\pi/2$, and FIG. 6B illustrates the spectral density of a filtered image 600b that may result from applying the Gabor filter 600a of FIG. 6A to the original image 400 illustrated in FIG. 4. In the filtered image 600b, the edges of the original image 400 that are substantially vertical (and perpendicular to the horizontal orientation of the envelope of the Gabor filter 600a) are more pronounced than are other elements within the original image 400. Accordingly, a Gabor filter 600a with an angle of rotation $\theta$ of 0 may be used to extract edges of an image, such as the image 400 illustrated in FIG. 4, along a horizontal path.

Figure 7B:
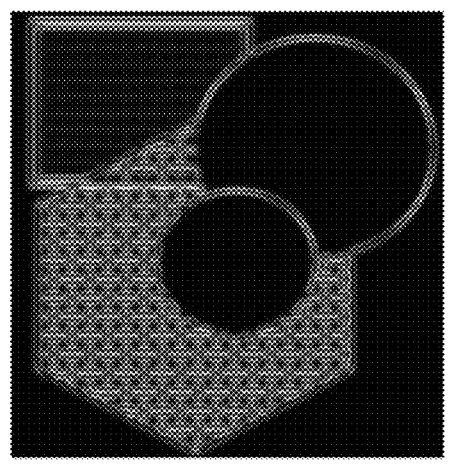
FIG. 7B illustrates spectral density of a filtered image that may result from applying the Gabor filters of FIG. 7A to the original image illustrated in FIG. 7A.
Figure 7A:
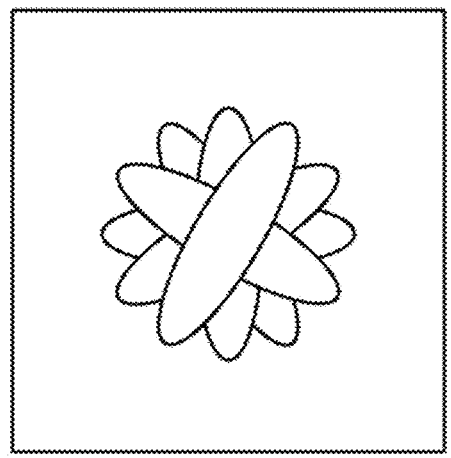
FIG. 7A illustrates the spectral density of multiple Gabor filters with different angles of rotation.

Likewise, FIG. 7A illustrates the spectral density of an multiple (e.g., 6) Gabor filters 700a with different angles of rotation $\theta$, and FIG. 7B illustrates spectral density of a filtered image 700b that may result from applying the Gabor filters 700a of FIG. 7A to the original image 400 illustrated in FIG. 4. In the filtered image 700b, the edges of the original image 400 that are perpendicular to the orientation of the envelopes of the Gabor filters 700a are more pronounced than are other elements within the original image 400. Accordingly, multiple Gabor filters 700a with multiple angles of rotation $\theta$ may be used to extract edges of an image along a multiple paths, thereby extracting the contour of the image.

Evaluating Image Quality

Gabor filters, or other suitable filters, may be generally used to evaluate the quality of images, e.g., in terms of visibility of those images to the human eye. For example, as will be discussed in reference to FIG. 8 Gabor filters may be used to evaluate the quality of an image based on the comparison between the original (intended) image and the printed or print-simulated image. In this case, similarities between the original and the printed, or print-simulated, images may indicate higher image quality, and differences between the original and the printed, or print-simulated, images may indicate low image quality. Additionally, or alternatively, as will be discussed in reference to FIG. 9, Gabor filters may be used, to evaluate the quality of an image based on a comparison between the intended foreground of the image and intended background of the image. In this, case, similarities between the foreground and the background may indicate lower image quality, and differences between the foreground and the background may indicate higher image quality.

Figure 8:
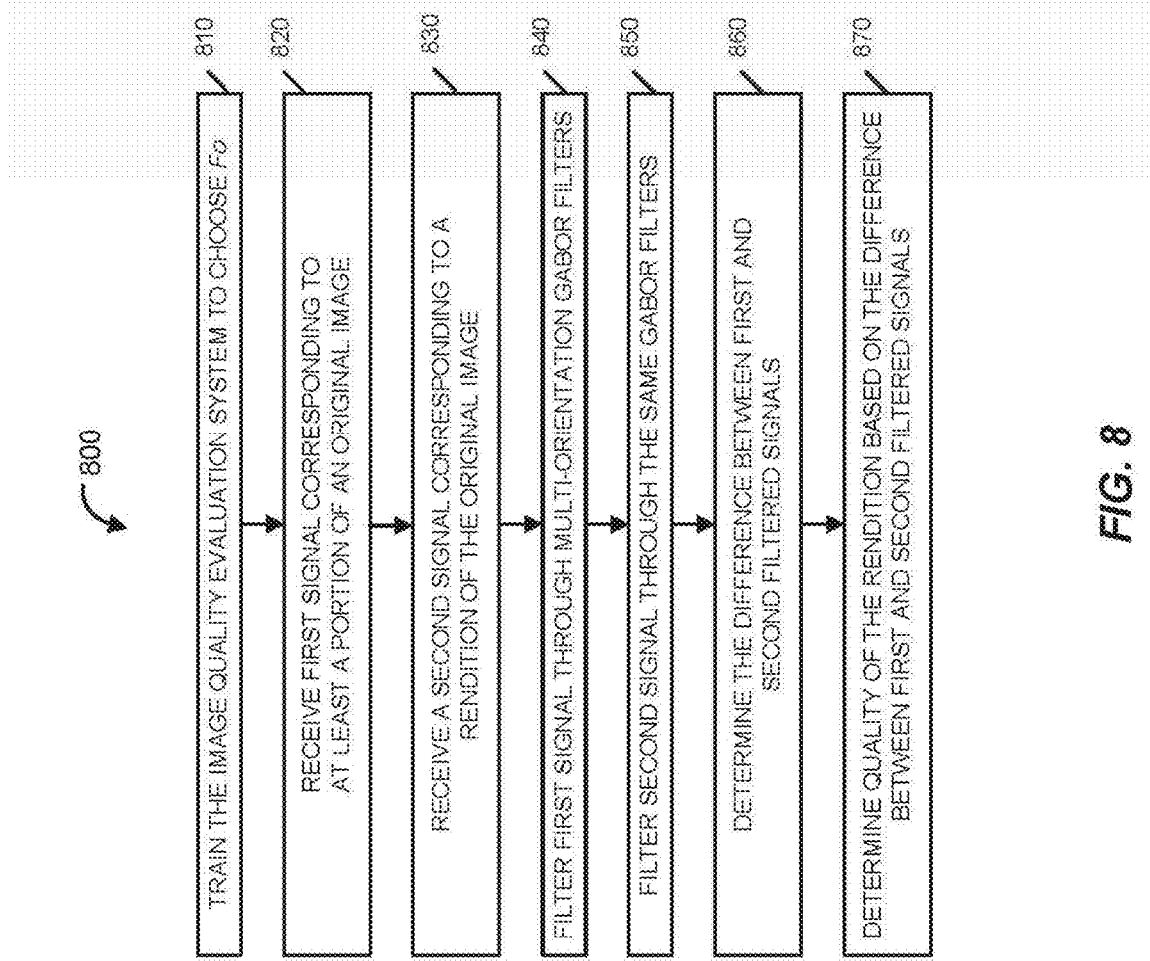
FIG. 8 is a flow diagram illustrating an example image quality evaluation method.

FIG. 8 is a flow diagram illustrating an example image quality evaluation method 800 for evaluating the quality of a printed image based on the comparison between the original (intended) image and a rendition of the original image, printed, or print-simulated image, e.g., on an absorbent article. For ease of explanation, FIG. 8 will be described with reference to FIGS. 1-7B. It will be understood, however, that the example image quality evaluation method 800 may be utilized with systems, devices and filters other than those illustrated in FIGS. 1-7B.

In order for an image quality evaluation system (such as the image quality evaluation system 202 discussed in reference to FIG. 2) to use Gabor filters to evaluate image quality, the image quality evaluation system may first need to determine an appropriate center frequency $F_0$ that corresponds to the edges within the images that the image quality evaluation system will be evaluating, or within images with similar visual, characteristics. To determine an appropriate center frequency $F_0$, the image quality evaluation system may be trained (block 810), for example, with a training set of images that may be similar to the images that the image quality evaluation system will be evaluating. More generally, image quality evaluation system may be trained to extract features within images that are in the expected range of sensitivity of human vision, for example, for an object viewed at arm's length. In particular, it may be preferable to train the image quality evaluation system so that its quality evaluation correlates with human ratings, as discussed, for example, in U.S. Pub. No. 2008/0132872 entitled "Absorbent Articles Comprising Graphics" and filed on Jun. 5, 2008, the disclosure of which is incorporated herein by reference.

Once the image quality evaluation system is suitably trained, the image quality evaluation system may evaluate the quality of printed and/or printed-simulated images. Because, as explained above, the image quality evaluation system may base its evaluation on a comparison between an original image and a rendition of that image, the image quality evaluation system may receive, as input, signals associated with both the original image (block 820) and the rending of the original image, such as the corresponding printed, or print-simulated image (block 830). In some instances, it may be desired to compare only a portion of the original image to the corresponding portion of the printed, or print-simulated image. Therefore, in some embodiments, the image quality evaluation system may receive, as input, signals associated with the respective portions of the original image and the rendering of the original image. More generally, the image quality evaluation system may receive, as input, a signal associated with the original image and a signal associated with another image that is indicative of a reproduction of the original image on a printing surface.

By way of example only, a signal associated with an image may take a number of forms, including a file with an image encoded according to any known standard (e.g., JPEG, Bitmap, and so on), or a bit stream. Furthermore, signals may also be received at the image quality evaluation system in a variety of ways. For example, one or both the original and the printed/print-simulated images may be stored locally (e.g., in a database). Alternatively, or in addition, one or both of these images may be received, or retrieved, from an image generator, such as a scanner, or from a remote server. The manner in which the signals are received at the image quality evaluation system may be based on a number of factors, including, for example, whether in the image quality evaluation system is operating in a manufacturing environment or in a product development environment.

Once the images, or corresponding signals, are received, or retrieved, each image may be filtered by the same set of Gabor filters (blocks 840-850). A set of Gabor filters may be selected such that each Gabor filter in the set has the same center frequency $F_0$ (e.g., selected to detect edges) but different orientations, or angles of rotation $\theta$. As a result, the selected set of Gabor filters may extract edges along several different orientation axes, and adding up these different edges may yield at least a partial contour plot corresponding to the received images. In some embodiments, a set of Gabor filters may be selected such that the orientations of the filters are spread evenly over the unit circle. For example, six different filters may be selected that are 360/6=60 degrees (or $\pi/3$) apart in orientation.

The number of different filters, their orientations, and other parameters of the selected Gabor filters may be determined based on a range of design variables. For example, if the original image is easily perceptible from the background, fewer Gabor filters (and fewer different orientations) may be necessary. By contrast, if the original image is very intricate, it may be preferable to use a larger number of filters and orientations. With respect to the central frequency $F_0$ of the Gabor filters, it is generally desirable to select a central frequency such that the frequencies corresponding to the edges in the image in question are not filtered out. The central frequency $F_0$ of the Gabor filters may be selected at least in part based on the resolution of the image of interest and on the intended viewing distance (i.e., the distance from the image to the human eye). For example, in some embodiments, the Gabor filters may be tuned for 200 dot-per-inch (dpi) images viewed at arm's length (approximately 18 inches). In these embodiments, the Gabor filters may have a wavelength in the range of 0.07 to 0.24 inches (or 14.0 to 48.0 pixels). For example, Gabor filters may be selected with a wavelength of 24 pixels and with a corresponding a central frequency $F_0$ of 2.62 cycles/degree.

Various other parameters of the Gabor filters may be selected, such as the ratio of the standard deviation of the Gaussian describing the Gabor filters transfer, function in the frequency domain to the filter center frequency $F_0$. In some embodiments, this ratio may be selected as 0.65. Other parameters of Gabor filters may include the ratio of angular interval between filter orientations (e.g., 60 degrees or $\pi/3$) and the standard deviation of the angular Gaussian function used to construct filters in the frequency plane. In some embodiments, this ratio may be equal to 1.5.

In general, passing a signal corresponding to an image (e.g., an original image or a rendering thereof) through a Gabor filter may be implemented in a variety of ways. For example, the signal may be convolved with the impulse response of the Gabor filter. Alternatively, to reduce computational complexity, the filtering function may be performed in the frequency domain through multiplication. Various other efficient computational filtering techniques, including those known in the art, may be used.

Once the received images, or signals associated with those images, have been filtered by a set of suitable Gabor filters, the filtered images, or the associated signals, may be used to determine the quality of the printed/print-simulated image (block 870). If the original image and the printed, or print-simulated image, are very similar, the resulting filtered original image and filtered printed/print-simulated image are likely to be similar as well. On the other had, if the two images are very different prior to passing through the Gabor filters, their filtered counterparts will probably be different as well. Accordingly, the degree to which the original image is similar to the printed/print-simulated image may be estimated by determining the difference between the filtered images (blocks 860-870), which may be a simpler task than comparing pre-filtered images. A larger difference between the two filtered images may yield a lower quality metric, and a smaller difference may yield a higher quality metric.

In some embodiments, the difference between the filtered images may be determined by subtracting one filtered image from the other (e.g., the Gabor-filtered original image for the Gabor-filtered printed/print-simulated image, or vice versa) in a pixel-by-pixel manner and analyzing the difference values associated with individual pixels, or groups of pixels. In general, if there is a substantially large difference between the two images with respect to a particular pixel, or a group of pixels, it may be inferred that the associated two pre-filtered images are different in the region corresponding to the pixels, or the group of pixels. This may suggest that the printed/print-simulated image is of relatively poor quality, at least in that region. More generally, smaller difference values may imply better image quality and greater difference values may imply worse image quality.

The determination of the difference between the two filtered images may be performed via pixel-by-pixel subtraction, as described above, but it may also be performed by visual inspection. For example, a user may compare the spectral density plot of the original image with that of the printed, or print-simulated image. If the two spectral density plots are substantially similar, the user may conclude that the images are substantially similar, and that the printed, or print-simulated image is of relatively high quality. If the two spectral density plots are relatively dissimilar, the user may conclude that the printed, or print-simulated image is of relatively low quality.

In some embodiments, or in some contexts, the difference between the filtered images on an individual pixel level might not be significant, or helpful. Instead, it may be more meaningful to determine the aggregate difference between the two filtered images and determine the quality of the printed/print-simulated image based on that aggregate difference. For example, in some embodiments, a difference between the two images may be determined on a pixel-by-pixel basis and absolute values of the determined differences may be calculated for every pixel. The absolute values associated with the difference between the two images for each pixel may be the be summed together, and the quality value, or score for the printed/print-simulated image may be determined based on that sum. In general, a higher value of that sum may indicate a larger discrepancy between the original and the printed/print-simulated image, suggesting lower quality. A lower value of the sum may be indicative of smaller discrepancy and, thus, a higher quality.

In some embodiments, the sum of absolute values of pixel-by-pixel differences may be quantified or mapped to another quality metric, such as a number on a scale from 0 to 10 ("0-10 quality metric"), where 0 corresponds to lowest quality and 10 corresponds to highest quality. This scale, may provide an objective quality metric that is easy to interpret. Moreover, the scale from 0 to 10 allows for comparison with the results of various image quality surveys, ratings, etc. (where participants are asked to evaluate image quality) that use the same or similar scales. The mapping may be performed in a variety of ways, e.g., based on a function of the sum, based on pre-defined thresholds, and so on.

Various quality metrics described above that may be determined using the image quality evaluation method 800 discussed in reference to FIG. 8, or using similar methods, may be further mapped to other metrics. For example, in some instances, in order to determine the visibility of a particular target image (or foreground image) within a background image, it may be desired to estimate the reaction time of a human being tasked with identifying the target image within the background image. If the reaction time is small, the target image is probably noticeable. One the other hand, if the reaction time is large, the target image may be inconspicuous, or hidden within the background.

In some embodiments, the reaction time of a human tasked with identifying a target image within a background image may be determined as a function of a quality metric determined using the image quality evaluation method 800 discussed in reference to FIG. 8 or using similar methods. For instance, the reaction time may be determined as a linear regression on the 0-10 quality metric associated with the target image described above. Additionally, or alternatively, the reaction time may be determined as a multivariate regression on the 0-10 quality metric associated with the target image and other variables related to, for example, different attributes of the printing surface onto which the target image is printed, or the characteristics of the target image. In one embodiment, the reaction time (RT) may be determined as a multivariate linear regression on the 0-10 quality metric (M) associated with the target image and a measure (S) related to the size of the target image; e.g., represented as:

$$RT=522.63-1190.77S-3.56M \qquad (9)$$

As indicated in equation (9), higher image quality and larger image size generally leads to shorter reaction time. Of course, it will be understood by one of ordinary skill in the art that the reaction time (RT) may be determined based on other variables. Furthermore the reaction time may be determined as a non-linear function of these variables and/or without performing any regression analysis at all.

Figure 9:
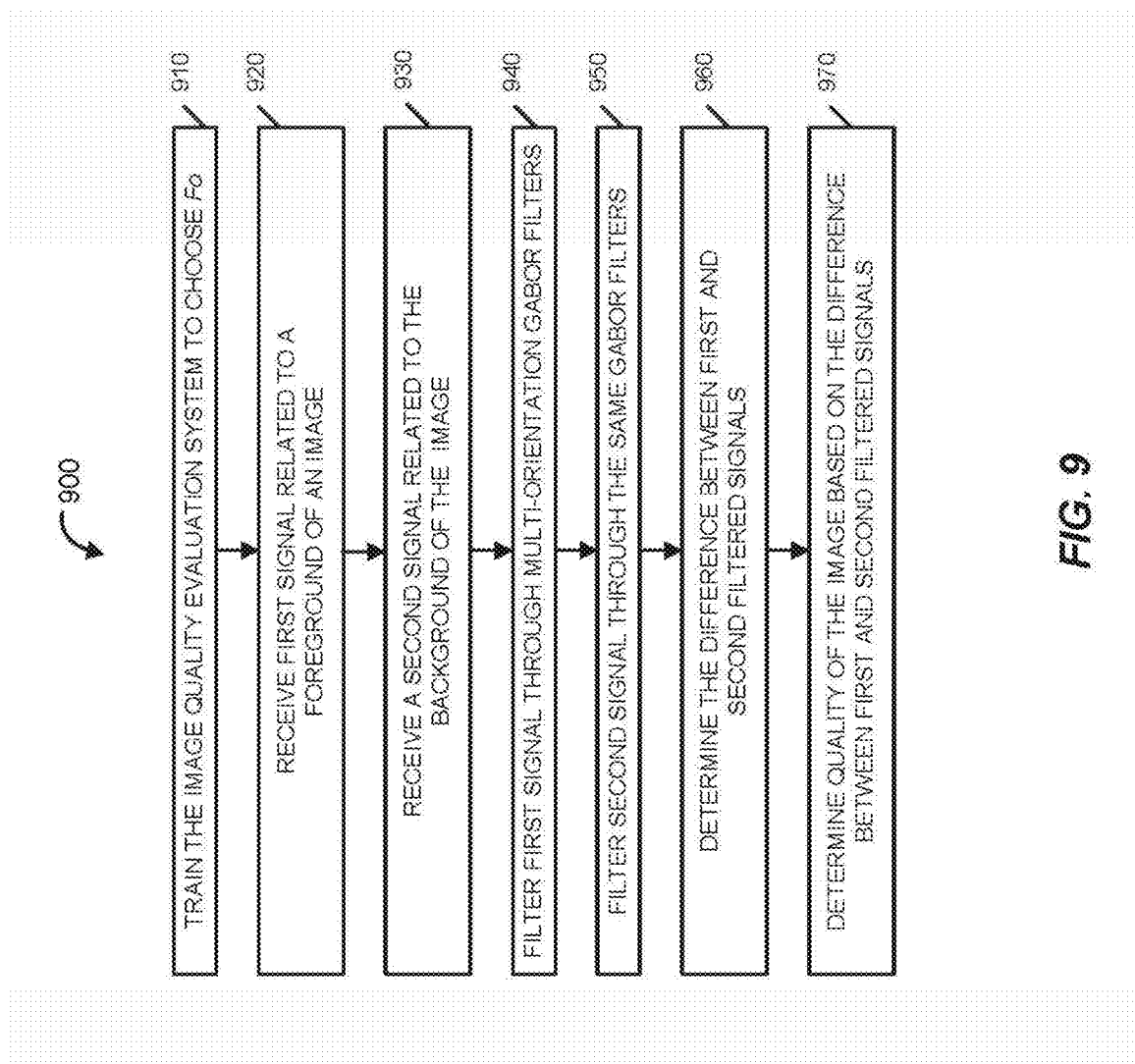
FIG. 9 is a flow diagram illustrating another example image quality evaluation method.

FIG. 9 is a flow diagram illustrating an example image quality evaluation method 900 for evaluating the quality of an image based on the comparison between the intended foreground of the image, and the intended background of the image. For ease of explanation, FIG. 9 will be described with reference to FIGS. 1-7B. It will be understood, however, that the example image quality evaluation method 900 may be utilized with systems, devices and filters other than those illustrated in FIGS. 1-7B.

In order for an image quality evaluation system (such as the image quality evaluation system 202 discussed in reference to FIG. 2) to evaluate the quality of an image, the image quality evaluation system may first need to be trained to extract features, within the image that are in the expected range of sensitivity of human vision, for example, for an object viewed at arm's length (block 910). Various training techniques may be used, including those discussed in reference to FIG. 8.

Once the image quality evaluation system is suitably trained, the image quality evaluation system may evaluate the quality of an image. Because, as explained above, the image quality evaluation system may base its evaluation on a comparison between the intended foreground of the image and the intended background of the image, the image quality evaluation system may receive, as input, signals associated with both the foreground of the image (block 920) and the background of the image (block 930). More generally, the image quality evaluation system may receive, as input, a signal associated with a foreground image and a signal associated with another image that is indicative of a reproduction of at least a portion of the foreground image on a printing surface.

As discussed in reference to FIG. 8, a signal associated with an image may take a number of forms, including a file with an image encoded according to any known standard (e.g., JPEG or Bitmap), or a bit stream. Furthermore, signals may also be received at the image quality evaluation system in a variety of ways, including those discussed in reference to FIG. 8.

Once the images, or corresponding signals, are received, or retrieved, each image may be filtered by the same set of Gabor filters (blocks 940-950). A set of Gabor filters may be selected such that each Gabor filter in the set has substantially the same center frequency $F_0$ (e.g., selected to detect edges) but different orientations, or angles of rotation θ. As a result, the selected set of Gabor filters may extract edges along several different orientation axes, and adding up these different edges may yield at least a partial contour plot corresponding to the received images.

The number of different filters, their orientations, and other parameters of the selected Gabor filters may be determined based on a range of design variables. With respect to the central frequency $F_0$ of the Gabor filters, it is generally desirable to select a central frequency such that the frequencies corresponding to the edges in the foreground and background images in question are not filtered out. The central frequency $F_0$ of the Gabor filters may be selected at least in part based on the resolution of the image and on the intended viewing distance (i.e., the distance from the image to the human eye), as discussed in reference to FIG. 8.

Once the received images, or signals associated with those images, have been filtered by a set of suitable Gabor filters, the filtered images, or the associated signals, may be used to determine the quality of the original image (block 870). If the foreground image and the background image are very similar, the resulting filtered image are likely to be similar as well. On the other had, if the two images are very different prior to passing through the Gabor filters, their filtered counterparts will probably be different as well. Accordingly, the degree to which the foreground is similar to the background may be estimated by determining the difference between the filtered images (blocks 960-970), which may be a simpler task than comparing pre-filtered images. A larger difference between the two filtered images may yield a higher quality metric, and a smaller difference may yield a lower quality metric.

The difference between the filtered images may be determined in a variety of ways, e.g., via a pixel-by-pixel subtraction, by visual inspection, aggregate subtraction, and other techniques, including those described in reference to FIG. 8. This difference may be quantified and/or mapped to other quality metrics, such as the 0-10 quality metric discussed above. As explained above, such metrics may provide an objective measure of quality that is easy to interpret and compare with the results of various image quality surveys, ratings, etc. (where participants are asked to evaluate image quality) that use the same or similar scales.

As explained above, techniques for evaluating image quality described herein (such as the methods 800, 900 discussed in reference to FIG. 8 and FIG. 9 respectively) may be used for a variety of purposes, in a range of different applications, and in various contexts. For example, such techniques may be used in manufacturing a product onto which the image is printed to ensure that the quality of the printed image is acceptable. These techniques may generally make quality control procedures more standardized and efficient by providing an objective measure of quality in an automated way.

Additionally, or alternatively, the techniques for image quality evaluation may be used when developing the product, for example, to optimize the product in terms of its capacity to display an image of relatively high quality. If the product is a diaper, or another type of an absorbent article, for instance, various attributes of the diaper may be optimized during product development using the techniques described above. Such attributes may include, by way of example only, the material of the diaper, its geometry, topology, thickness, chemical properties, seam patterns, an so on. Some or all of these attributes may be optimized to improve the capacity of the diaper to display images (e.g., cartoon characters). Again, because the techniques for evaluating the quality of a printed, or print-simulated image described above provide an objective quality metric, they may result in a more efficient product development process.

The image quality evaluation techniques may also be used to optimize the images themselves. That is, various characteristics of an image may be optimized so that the printed rendering of the image is of acceptable quality. Such characteristics may include, for example, thickness of lines in the image, color contrast within the image, size of the image, and so on.

Several example techniques for evaluating image quality have been described above in terms of particular embodiments. However, other embodiments are possible. For example, various pre-processing steps, such as smoothing, binarization, thinning, and minutiae detection may be included in various embodiments to enhance the effectiveness of the techniques described above. As one particular example, received images (e.g., original images, printed/print-simulated images, or both) may be broken down into color channels prior to any processing, and each color channel may be processed separately. In a consumer evaluation context, received images may be broken into color channels according to the Lab color space. In a production context, receiving images may be broken into color channels according to the CMYK color sample.

Various computational techniques, including those known in the art, may be used to improve the computational efficiency of the techniques described herein. For example, various efficient algorithms may be used to transfer data between space and frequency domains.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with ally meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A non-transitory computer-readable medium recording therein an image quality evaluation program that, when executed on a processor, causes a computer to execute a process comprising:
  receiving a first signal indicative of a first image;
  receiving a second signal indicative of a second image, wherein the second image is indicative of a reproduction of at least a portion of the first image associated with rendering the first image on a printing surface;
  generating a first filtered signal corresponding to a filtered first image by passing the first received signal through at least one first filter;
  generating a second filtered signal corresponding to a filtered second image by passing the second received signal through at least one second filter; and
  determining a quality of the second image based on a difference between the first filtered signal and the second filtered signal;
  wherein at least one of the filters is a Gabor filter;
  wherein generating the first filtered signal by passing the first received signal through the at least one first filter comprises passing the first received signal through a plurality of Gabor filters to generate a first plurality of filtered signals and adding together at least some of the first plurality of filtered signals to form a first sum.

2. The computer-readable medium of claim 1, wherein generating the second filtered signal by passing the second received signal through the at least one second filter comprises passing the second received signal through a plurality of Gabor filters to generate a second plurality of filtered signals and adding together at least some of the second plurality of filtered signals to form a second sum.

3. The computer-readable medium of claim 2, wherein the plurality of Gabor filters have a same center frequency but different orientations.

4. The computer-readable medium of claim 3, the process further comprising selecting the center frequency based on a plurality of training images.

5. The computer-readable medium of claim 1, wherein the determining of the quality includes determining a quality value that is between 0 and 10, with 0 indicating lowest quality and 10 indicating highest quality.

6. The computer-readable medium of claim 2, wherein the determining of the quality includes determining a quality value of the second image based on a difference between the first sum and the second sum.

7. The computer-readable medium of claim 6, wherein the second image is a simulated printed rendition of the first image.

8. The computer-readable medium of claim 7, wherein the second image is a rendition of the first image on the printing surface.

9. The computer-readable medium of claim 1, wherein the first image is a foreground portion of a third image and second image is a background portion of the third image.

10. The computer-readable medium of claim 1, wherein the first filter is the same as the second filter.

11. A method of evaluating a quality of an image for use in an image quality evaluation computing system, the image quality evaluation computing system having a processor and memory, the memory including computer-readable instructions, which, when executed on the processor, implement an image quality evaluation application, the method comprising:
using the image quality evaluation application to receive a first signal indicative of a first image;
using the image quality evaluation application to receive a second signal indicative of a second image, wherein the second image corresponds to a rendition of the first image on a printing surface;
using the image quality evaluation application to extract at least a partial contour of the first image, wherein using the image quality evaluation application to extract the at least partial contour of the first image comprises using the image quality evaluation application to generate a first filtered signal by passing the first received signal through at least one Gabor first filter;
using the image quality evaluation application to extract at least a partial contour of the second image; and
using the image quality evaluation application to determine a quality value for the second image based on a difference between the at least partial contour of the first image and the at least partial contour of the second image.

12. The method of claim 11, wherein using the image quality evaluation application to extract the at least partial contour of the second image comprises using the image quality evaluation application to generate a second filtered signal by passing the second received signal through at least one second Gabor filter.

13. The method of claim 11, wherein using the image quality evaluation application to determine a quality value of the second image comprises:
using the image quality evaluation application to determine the difference between the at least partial contour of the first image and the at least partial contour of the second image on a pixel-by-pixel basis;
using the image quality evaluation application to determine a plurality of absolute values comprising an absolute value of each determined difference for the pixels;
using the image quality evaluation application to determine a sum of the determined plurality of absolute values; and
using the image quality evaluation application to determine the quality value of the second image based on the determined sum.

14. The method of claim 12, further comprising correlating the determined sum with a reaction time of a human tasked with identifying the first image within the second image to form a correlated relationship.

15. The method of claim 14, further comprising determining the quality value based on the correlated relationship.

16. The method of claim 15, further comprising improving a new printing surface based on the determined quality value to improve the capacity of the new printing surface to display an image of better quality.

17. The method of claim 11, wherein the first filter is the same as the second filter.

18. A system for evaluating a quality of an image, the system having a processor and a memory, the memory including computer-readable instructions, which, when executed on the processor, implement an image quality evaluation application, the image quality evaluation application configured to:
receive a first signal indicative of a first image;
receive a second signal indicative of a second image, wherein the second image corresponds to a rendition of the first image on a priming surface;
generate a first filtered signal corresponding to filtered first image by passing the first received signal through at least one first filter;
generate a second filtered signal corresponding to a filtered second image by passing the second received signal through the at least one second filter; and
determine a quality value of the second image based on a difference between the first filtered signal and the second filtered signal;
wherein at least one of the filters is a Gabor filter;
wherein generating the first filtered signal by passing the first received signal through the at least one first filter comprises passing the first received signal through a plurality of Gabor filters to generate a first plurality of filtered signals and adding together at least some of the first plurality of filtered signals to form a first sum.

19. A method of evaluating a quality of an image for use in an image quality evaluation computing system, the image quality evaluation computing system having a processor and memory, the memory including computer-readable instructions, which, when executed on the processor, implement an image quality evaluation application, the method comprising:
using the image quality evaluation application to receive a first signal indicative of a first image;
using the image quality evaluation application to receive a second signal indicative of a second image, wherein the second image corresponds to a rendition of the first image on a printing surface;
using the image quality evaluation application to extract at least a partial contour of the first image;

using the image quality evaluation application to extract at least a partial contour of the second image;

using the image quality evaluation application to determine a quality value for the second image based on a difference between the at least partial contour of the first image and the at least partial contour of the second image;

using the image quality evaluation application to determine the difference between the at least partial contour of the first image and the at least partial contour of the second image on a pixel-by-pixel basis;

using the image quality evaluation application to determine a plurality of absolute values comprising an absolute value of each determined difference for the pixels;

using the image quality evaluation application to determine a sum of the determined plurality of absolute values; and using the image quality evaluation application to determine the quality value of the second image based on the determined sum.

20. A non-transitory computer-readable medium recording therein an image quality evaluation program that, when executed on a processor, causes a computer to execute a process comprising:

receiving a first signal indicative of a first image;

receiving a second signal indicative of a second image, wherein the second image is indicative of a reproduction of at least a portion of the first image associated with rendering the first image on a printing surface;

generating a first filtered signal corresponding to a filtered first image by passing the first received signal through at least one first filter;

generating a second filtered signal corresponding to a filtered second image by passing the second received signal through at least one second filter; and determining a quality of the second image based on a difference between the first filtered signal and the second filtered signal;

wherein the first image is a foreground portion of a third image, and wherein the second image is a background portion of the third image.

* * * * *